(12) United States Patent
Meyers et al.

(10) Patent No.: US 12,105,360 B2
(45) Date of Patent: Oct. 1, 2024

(54) CONTACT LENS

(71) Applicant: Innovega, Inc., Bellevue, WA (US)

(72) Inventors: William E. Meyers, Scottsdale, AZ (US); Jerome A. Legerton, Jupiter, FL (US); Jay P. Marsh, Perris, CA (US)

(73) Assignee: Innovega, Inc., Bellevue, WA (US)

( * ) Notice: Subject to any disclaimer, the term of this patent is extended or adjusted under 35 U.S.C. 154(b) by 58 days.

(21) Appl. No.: 15/867,102

(22) Filed: Jan. 10, 2018

(65) Prior Publication Data

US 2018/0129073 A1    May 10, 2018

Related U.S. Application Data

(62) Division of application No. 14/948,683, filed on Nov. 23, 2015, now Pat. No. 9,869,884.

(Continued)

(51) Int. Cl.
| | |
|---|---|
| *G02C 7/04* | (2006.01) |
| *B32B 27/08* | (2006.01) |
| *B32B 27/28* | (2006.01) |
| *B32B 27/30* | (2006.01) |
| *B32B 27/32* | (2006.01) |
| *B32B 27/40* | (2006.01) |

(Continued)

(52) U.S. Cl.
CPC ............... *G02C 7/049* (2013.01); *B32B 27/08* (2013.01); *B32B 27/283* (2013.01); *B32B 27/308* (2013.01); *B32B 27/322* (2013.01); *B32B 27/40* (2013.01); *C08L 83/04* (2013.01); *G02B 1/043* (2013.01); *B29C 39/00* (2013.01); *B29L 2011/0041* (2013.01); *B32B 2250/02* (2013.01); *B32B 2307/702* (2013.01); *B32B 2307/704* (2013.01); *B32B 2307/724* (2013.01); *B32B 2307/726* (2013.01); *B32B 2551/00* (2013.01); *G02C 2202/16* (2013.01)

(58) Field of Classification Search
None
See application file for complete search history.

(56) References Cited

U.S. PATENT DOCUMENTS

| | | | |
|---|---|---|---|
| 4,099,859 A | | 7/1978 | Merrill |
| 4,217,038 A | * | 8/1980 | Letter ................ B29D 11/0073 |
| | | | 351/159.33 |

(Continued)

FOREIGN PATENT DOCUMENTS

| | | |
|---|---|---|
| JP | 11-502949 A | 3/1999 |
| JP | 2003-516562 A | 5/2003 |

(Continued)

OTHER PUBLICATIONS

Holden Investigative Ophthalmology & Visual Science pp. 1161-1167 ( 1984).*

(Continued)

*Primary Examiner* — Kenneth J Stachel
(74) *Attorney, Agent, or Firm* — Sheppard Mullin Richter & Hampton LLP

(57) ABSTRACT

A contact lens constructed to limit the water transmissibility of at least one area of the lens while maintaining at least a minimum oxygen transmissibility. The water transmissibility maximum and oxygen permeability minimum are achieved by a predetermined lens thickness of a single lens material or by the use of two or more material layers.

10 Claims, 9 Drawing Sheets

Related U.S. Application Data

(60) Provisional application No. 62/083,198, filed on Nov. 22, 2014.

(51) Int. Cl.
| | | |
|---|---|---|
| *C08L 83/04* | (2006.01) | |
| *G02B 1/04* | (2006.01) | |
| *B29C 39/00* | (2006.01) | |
| *B29L 11/00* | (2006.01) | |

(56) References Cited

U.S. PATENT DOCUMENTS

| | | | |
|---|---|---|---|
| 5,760,100 A | 6/1998 | Nicolson et al. | |
| 5,789,461 A * | 8/1998 | Nicolson | A61L 27/26 264/1.36 |
| 2003/0008154 A1 | 1/2003 | Aguado et al. | |
| 2007/0109495 A1* | 5/2007 | Back | G02C 7/048 351/159.33 |
| 2007/0149699 A1* | 6/2007 | Matsumoto | C08F 230/08 524/556 |
| 2007/0291224 A1 | 12/2007 | Lai | |
| 2008/0100796 A1 | 5/2008 | Pruitt et al. | |
| 2012/0109595 A1* | 5/2012 | Legerton | G02C 7/047 703/1 |
| 2014/0125944 A1 | 5/2014 | Huang | |

FOREIGN PATENT DOCUMENTS

| | | |
|---|---|---|
| JP | 2010-508563 A | 3/2013 |
| JP | 2013-190822 A | 9/2013 |
| JP | 2015-79246 A | 4/2015 |
| WO | 2013191148 A1 | 12/2013 |
| WO | 20140123956 A1 | 8/2014 |

OTHER PUBLICATIONS

Ho Surface of Silicone Contact Lenses JI of Biomedical Materials Research 22 919-937 (1988).*
Singh J Macromol Sci C32(3&4) pp. 521-534 (1992).*
Silicone Hawley's Chemical Dictionary ( 2007).*
Fornasiero F et al. Steady-state diffusion of water through soft-contact-lens materials, Biomatrials, Elsevier Science Publishers BV., Barking, GB, vol. 26, No. 28, Oct. 1, 2005 (Oct. 1, 2005), pp. 5704-5716, XPO27767524, ISSN: 0142-9612 [retrieved on Oct. 1, 2005].
European Patent Office, European Search Report, Oct. 23, 2019.
Matthew D. Young, B.S. et al, Calibrated Oxygen Permeability of 35 Conventional Hydrogel Materials and Correlation with Water Content, Eye & Contact Lens, vol. 29, No. 2, 2003, pp. 126-133.
Ophthalmic optics—Contact Lenses—Part 4: Physicochemical properties of contact lens materials, ISO 18369-4:2017(E), pp. 1-36.
Andre, Mark and Matt Lampa, "The Influence of Center Thickness on the Performance of Custom Soft Contact Lenses," Soft Special Edition, 2021, Amsterdam, Netherlands.
Burns, Robert P. et al., "Effect of Silicone Contact Lenses on Corneal Epithelial Metabolism," John E. Weeks Institute for the Advancement of Ophthalmology, University of Oregon Medical School, Portland, Oregon, Feb. 1971, pp. 486-489.
Hill, Richard M. and John Schoessler, "Optical Membranes of Silicone Rubber," Clinical and Experimental Optometry. 50:8, pp. 233-236, 1967.
Holden, Brien A. and George W. Mertz, "Critical Oxygen Levels to Avoid Corneal Edema for Daily and Extended Wear Contact Lenses," Cornea and Contact Lens Research Unit, School of Optometry, pp. 1161-1167, 1983, University of New South Wales, Kensington, Sydney, N.S.W., Australia.
"Optics and optical instruments—Contact lenses. Part 2: Determination of oxygen permeability and transmissibility by the cuolometric method," International Standard, First Edition, Feb. 15, 2000.
Mandell, Robert B., "Contact Lens Practice," 1998, pp. 520-521, Fourth Edition, published by Charles C. Thomas, Springfield, IL.
Singh, J. & K.K. Agrawal, "Polymeric Materials for Contact Lenses," Journal of Macromolecular Science, Part C: Polymer Reviews, 1992, vol. 32:3-4, pp. 521-534.

* cited by examiner

CONTACT LENS

CROSS REFERENCE TO RELATED APPLICATIONS

This application is a divisional application of U.S. patent application Ser. No. 14/948,683 filed on Nov. 23, 2015, which in turn claims the benefit of U.S. Prov. Pat. App. No. 62/083,198 filed on Nov. 22, 2014, the entireties of which are hereby incorporated by reference.

STATEMENT REGARDING FEDERALLY SPONSORED RESEARCH OR DEVELOPMENT

This invention was not federally sponsored.

BACKGROUND

Field of the invention: This disclosure relates to the general field of optical lenses, and more specifically toward a contact lens constructed to limit the water transmissibility of at least one area of the lens while maintaining at least a minimum oxygen transmissibility. The water transmissibility maximum and oxygen permeability minimum are achieved by a predetermined lens thickness of a single lens material or by the use of two or more material layers.

The health of the eyes of consumers wearing contact lenses is greatly dependent on the amount of oxygen transmitted through the lens. Materials from which the lenses are made are generally chosen for their oxygen permeability and numerous studies have been performed to determine the minimum amount of oxygen required to maintain a healthy cornea.

Gas permeability or more relevant to this discussion, oxygen permeability is mathematically described using the coefficient Dk, where D being diffusivity ($cm^2$/sec), a measure of how fast the oxygen moves through the material, and k being the solubility (ml $O_2$/ml of material×mm Hg), a measure of how much oxygen is contained in the material. The coefficient of oxygen transmissibility (Dk/t or Dk/L) is derived by dividing the oxygen permeability of a material by the thickness of the material in centimeters.

The best permeabilities now offered in commercial lens products for the general public are in the range of Dk=80 to $150 \times 10^{-11}$ ($cm^2$/sec) (mL $O_2$)/(mL×mm Hg) (Barrers). The materials of these lenses are generally silicone acrylates or copolymers of silicone acrylates with hydrophilic monomers thereby creating silicone hydrogels. The former are typically rigid lenses while the latter are soft lenses. These lenses must be offered in thin designs to support corneal health, which can lead to problems with durability, handling and, in the case of hydrogels, dehydration.

Dehydration, the loss of water from the interior of the lens, leads to changes in the geometry of the lens wherein the lens decreases in diameter, thickness, and radius of curvature, changes in lens optical power and the lens demonstrates poor wetting on the lens surface. Lens shrinkage can lead to tightening of the lens on the eye as indicated by reduced on-eye movement, while poor wetting leads to discomfort when the eyelid passes over the lens on blink. Often dehydration effects are addressed by fitting lenses with longer posterior radius of curvature of the lens than the curvature of the underlying cornea. In these cases, lens shrinkage only serves to bring the lens into a correct relationship to the eye while maintaining lens movement. To prevent discomfort, the lenses are surface treated in an attempt to reduce the wetting angle and in turn maintain a tear film on the front of the lens, or the lens is prefilled with a lubricating substance that may exude onto the surface to maintain comfort during wearing.

The description above is generally true for all lenses in commercial use today with one important exception. That exception is the lens made of silicone rubber (cross-linked polydimethylsiloxane, PDMS). PDMS is attractive for contact lens use firstly because of its extremely high permeability to oxygen, being more than twice the permeability of the highest competitive material; secondly, PDMS is soft and similar in mechanical properties to human tissue; thirdly, PDMS has a long history of safe use as a biomaterial in implants and wound dressings; fourthly, PDMS is easily molded with high transfer of design features to the final lens; and lastly, PDMS is not a hydrogel and thus is not subject to bacterial invasion.

Unfortunately, PDMS (first appearing in contact lenses nearly 50 years ago) has had no success in the general contact lens market. One reason is generally described as a "sticking" problem, which is also described as "lens adherence." Non-movement of the lens can often be observed in as little as 15 minutes after application. In fact, early experience included actual adherence of the lens to the cornea leading to loss of small patches of epithelium upon lens removal. Such occurrences, though painful, were not sight threatening since the cornea repairs itself rather rapidly; even so, any break in the corneal surface presents the opportunity for infection.

The PDMS lens lost a place in the general contact lens market with the exception of refractive correction of pediatric aphakia. This condition in infants left untreated leads without exception to blindness in the eye lacking the internal crystalline lens. Refractive treatment with the PDMS contact lens for pediatric aphakia is unique due to the need for extreme optical power in the contact lens that requires a thickness profile with a high center thickness. Sticking problems are rarely observed in such applications. Thick lenses are known to promote lens movement due to forceful contact with the lid during blinking. Furthermore, due to the high oxygen permeability, the lenses for pediatric aphakia have regulatory approval for continuous wearing of up to 30 days; hence, there is no need to remove the lenses frequently thereby reducing the likelihood of epithelial detachment.

Following the inference of the pediatric success with lenses with a thick center and using approaches to improving lens surface wetting (typically plasma treatment) early efforts were made to address the lens sticking problem. Modified lens geometry designs with looser lens to eye relationships coupled with plasma treated lenses were explored with no success. Since the lens contained little water (typically less than 0.2%), lens dehydration did not appear to be a likely cause of the lens adherence.

The PDMS contact lens has a high solubility for oxygen and a large diffusivity (rate of internal flux) for oxygen (deriving from the extreme mobility of the silicon atoms in the polymer) and these properties lead to the very high oxygen permeability (Dk). Permeability is in fact a product of these two properties. Diffusivity of the permeant, as discussed above for oxygen, is one property. The second property is the solubility of the permeant in the material through which it is permeating. Materials having high values for both of the properties for a particular permeant always have high permeabilities for that permeant. Since PDMS has a very low solubility for water it is often assumed that water might transport through the material at a slow rate. Following this assumption one would conclude shrinkage due to dehydration is not possible and water transport by permeation is minimal. Strategies to minimize water transport were not recognized or reported as a likely approach to solving the "sticking" problem.

It is the recognition that the assumption by contact lens designers of low water transport by PDMS is erroneous and that water transport itself is the primary cause of lens sticking that is a foundation for this disclosure. Though liquid water is barely detectable inside a PDMS lens, water vapor molecules are able to freely pass through the material. In fact while the permeability for oxygen by this material is impressive the permeability for water vapor is more than 50 times higher. Water permeability of this magnitude is capable of transporting the entire tear volume from beneath a lens in a matter of minutes. Depletion of the post lens tear film and the water associated with the epithelial mucin layer can leave both the lens and the cornea surfaces hydrophobic and thereby increase the attraction of each to the other. Such hydrophobic surface attraction will inevitably lead to adherence and non-movement. These effects would not likely be alleviated by surface treatment or loose fitting lens design strategies. There would be some improvement observed with wearers whose exposure to the lens involves greater than normal durations of closed eye wearing such as infants.

At first thought the solution to sticking would be to find another material with very high oxygen transmission but without the rapid water transmission. Of course such a material would be required to have the mechanical properties suitable for a contact lens, be relatively inexpensive and manufacture-able by means of low cost processes such as automatable cast molding, and requiring few stock keeping units (SKU's) to cover the vast majority of patients. A new material would have to be non-toxic and satisfactorily biocompatible while being simple to fit, comfortable to wear and optically transparent. The search for such a material has proceeded for nearly fifty years and a material meeting all of these requirements has yet to be presented. Lenses made of rigid gas permeable materials have come closest but are less comfortable to wear, difficult to fit, expensive to manufacture and require larger stock keeping units.

Holden and Mertz generated criteria for minimum oxygen transmissibility for maintenance of normal corneal physiology for wearing contact lenses with an open eye (daily wear) and for wearing lenses with normal overnight periods of sleep (extended wear or continuous wear).

Holden and Mertz studied the critical oxygen levels to avoid corneal edema and defined them in terms of oxygen transmissibility and equivalent oxygen percentage. The relationship between corneal edema and hydrogel lens oxygen transmissibility was examined for both daily and extended contact lens wear by measuring the corneal swelling response induced by a variety of contact lenses over a 36 hour wearing period. The relationships derived enabled average edema levels that occur with daily and extended wear in a population of normal young adults to be predicted to within ±1.0%. The critical lens oxygen transmissibility required to avoid edema for daily and extended contact lens wear were obtained from the derived curves. Holden and Mertz found under daily wear conditions that lenses having an oxygen transmissibility (Dk/t) of at least $24.1\pm2.7\times10^{-9}$ $(cm^3\ O_2)/(cm^2 \cdot s \cdot mmHg)$ or Barrers/cm, an Equivalent Oxygen Percentage (EOP) of 9.9%, did not induce corneal edema.

SUMMARY

The present disclosure addresses the problem through an alternative approach; creating a lens that meets at least the Holden Mertz minimum criteria for oxygen transmissibility while manifesting water transport of no greater than successful commercialized contact lenses. The present invention discloses means for reducing the water transmissibility while maintaining a minimum level of oxygen transmissibility. A first embodiment of the present invention is a lens having a predetermined thickness to reduce the water transmissibility of an ultrahigh permeable lens material to a maximum acceptable level and while maintaining the oxygen transmissibility to a minimum acceptable level. A second embodiment of the present invention is a lens comprising at least two materials where in the coupled materials are configured into a single device to reduce the water transmissibility of the composite lens to a maximum acceptable level while maintaining the oxygen transmissibility to at least a minimum acceptable level.

Historically, a seemingly parallel approach has been considered in the lenses referred to as hybrid or composite lenses, however that approach (such as in the Saturn Lens, Softperm Lens, Synergeyes Lens brand lenses) did not attempt to have the comprising materials work together by merging their properties, but rather by using the disparate materials in different locations to perform separate functions (side by side, central eye and peripheral eye). The current disclosure provides for materials in sequence delivering their summed properties to obtain desired performance at the same location on the lens and hence the same location on the eye. The current disclosure configures the disparate materials in a "sandwich" or layered configuration with the materials in parallel and perpendicular to the axis of the lens, rather than concentric to the axis of the lens as in the above-mentioned composite or hybrid type lens.

Prior art also discloses a lens having an anterior rigid layer and a posterior soft layer for the purpose of providing lens comfort when in contact with the eye and while delivering rigid lens optics. Such a laminate lens does not address the issues of balancing a maximum acceptable water transmissibility while maintaining at least a minimum oxygen transmissibility.

Additional art teaches lenses with air cavities, and cavities filled with fluid and gel materials, which do not address the issues of limiting the lens to a maximum water transmissibility while maintaining a minimum oxygen transmissibility. Prior art also discloses the inclusion of components and elements in lenses which do not address the issues of balancing a maximum acceptable water transmissibility while maintaining at least a minimum oxygen transmissibility.

It is an object of the disclosure to provide a contact lens with a minimum oxygen transmissibility for maintenance of normal corneal physiology for wearing contact lenses.

It is another object of the disclosure to provide a contact lens with a water transport of no greater than other successful commercialized contact lenses.

It is a further object of this disclosure to provide a composite soft or rigid contact lens with water transmissibility of the composite lens below a maximum acceptable level while having an oxygen transmissibility of at least a minimum acceptable level.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used herein, a contact lens is made from one or more films, including a composite film. A composite film is a film made up of multiple films, including multiple layers of films. In some embodiments, though not necessarily all embodiments, the contact lens is made solely from the composite film, in which case the terms could be used interchangeably.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the current disclosure and together with the description, serve to explain the principles of this invention. The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

Figure 1:
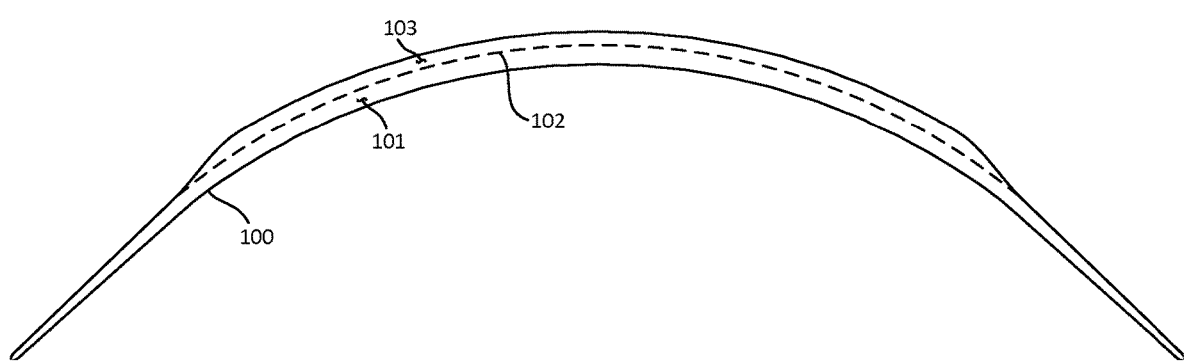
FIG. 1 is a cross-sectional view of a contact lens with a first thickness and a second greater thickness, in accordance with selected embodiments of the current disclosure.

Many aspects of the current disclosure can be better understood with the references made to the drawings below. The components in the drawings are not necessarily drawn to scale. Instead, emphasis is placed upon clearly illustrating the components of the present disclosure. Moreover, like reference numerals designate corresponding parts through the several views in the drawings.

A first embodiment of the present invention comprises a single lens material having an ultrahigh permeability to oxygen and water vapor. A thickness profile for the lens is selected to reduce the water transmissibility to at or below a maximum level while keeping the oxygen transmissibility to at or above a minimum level. Fornasiero and coworkers (2005) measured steady state diffusion of water through commercially successful hydrogel and silicone hydrogel lens materials while Rofojo (1980) measured water transport through silicone rubber lens materials. While the metrics for the two studies were reported to be different, a conversion is possible to put the water permeability into a common metric.

In parallel, the lens thickness profiles of two of the commercially successful lenses are known. A resultant water transmissibility is calculated as the water permeability divided by the thickness. It is noteworthy that the water permeability varies with the humidity surrounding the material as it is measured. Further, the permeability may vary as the hydrogel materials dehydrate and become thinner. Even so, a mean value for a range of ambient humidity can be used for the purpose of the present disclosure.

Water permeability can be reported as equal to pg/pm cm$^2$ s−1 or equal to cm/pm and can be converted to cm$^3$/pg H$_2$O and mmHG/Atm which in turn can be converted to Barrers. Such a conversion allows the conventional hydrogel and silicone hydrogel measured values for water permeability to be compared to the reported values for water permeability of silicone rubber materials. The following table presents the values reported for comparison:

TABLE 1

| Material | Flux* | % Humidity | Thickness** | Water Permeability Barrers*** |
|---|---|---|---|---|
| Polymacon | 4.7 | 50 | 145 | 11110 |
| Balafilcon | 8.05 | 50 | 144 | 18964 |
| Elastifilcon | NA | NA | NA | 40000 |

*$10^{-6} \cdot g \cdot cm^{-2} \cdot s^{-1}$
**Steady State
***$10^{-11}$ [$cm^3 \cdot cm$]/[$cm^2 \cdot s \cdot mmHg$]

Historical reports of lens thickness for polymacon include commercialized lenses ranging from center thickness values from 0.04 to 0.18 mm. The majority of lenses have center thickness values between 0.08 and 0.12 mm or an average of 0.10 mm. Lenses made of polymacon have demonstrated sustained use for more than 50 years with no reports of lens adherence. The study of the long term commercial success of polymacon lenses and the absence of reports of lens adherence or "sticking" suggests that the water vapor transmissibility is sufficiently low to prevent depletion of the post lens tear layer. It is noteworthy that polymacon constitutes a small percentage of new fits because it also has a low oxygen permeability and falls below the Holden Mertz criteria for oxygen delivery for open eye wearing.

The disclosure herein provides for the use of a predetermined lens thickness as one embodiment for reducing the water transmissibility to an approximate level demonstrated by polymacon lenses while maintaining an oxygen transmissibility at or above the Holden Mertz criteria for open eye wearing. The Holden Mertz value set as the minimum oxygen transmissibility (Dk/t) for lenses of the present invention is $24.1 \pm 2.7 \times 10^{-9}$ ($cm^3$ $O_2$)/($cm^2 \cdot s \cdot mmHg$). By example, one variant of polydimethylsiloxane has a reported Dk=$340 \times 10^{-11}$ ($cm^2/sec$) (mL $O_2$)/(mL×mm Hg). It is possible for other variants of the same material to have higher or lower measured values of Dk.

A lens made of a material with a Dk=$340 \times 10^{-11}$ ($cm^2/sec$) (mL $O_2$)/(mL×mm Hg) could have a center thickness as great as 0.141 cm to maintain a Dk/t=$24.1 \times 10^{-9}$ (cm×ml $O_2$)/(sec×ml×mmHg). While this is an order of magnitude greater than commercialized lenses, the oxygen transmissibility would be expected to meet the open eye (daily wear) requirement. Such a thickness would also reduce the water transmissibility of the same lens to a level well below the level demonstrated by commercially successful polymacon and silicone hydrogel lenses.

Since a lens thickness of 1.41 mm is excessive and unprecedented, the present invention is directed to minimizing the thickness to achieve a water transmissibility substantially equivalent to polymacon. A harmonic thickness value for polymacon lenses of 0.08 mm is selected to create the limiting maximum water transmissibility for the present invention. By way of example, the water transmissibility of polymacon at 50% humidity converted to permeability in Barrers is 11,110. Using the harmonic thickness of the lens as 0.008 cm, the water transmissibility (B/t) of the lens example is found to be 13,887.5. Continuing with the example, the reported permeability value of a variant of polydimethylsiloxane is found to be 40,000 Barrers. To achieve one embodiment of a lens of the present disclosure, the lens thickness (t) to achieve a B/t=13887.5 with a material with a water permeability in Barrers of 40,000 is calculated to be 0.029 cm, a thickness that is more than 3 times the average lens made of hydrogel and silicone hydrogel materials. In a particular embodiment, the contact lens has an average thickness of greater than 0.4 mm. In another embodiment, the contact lens has an average thickness of greater than 0.3 mm. In yet another embodiment, the contact lens has an average thickness of greater than 0.2 mm A particular embodiment of the current disclosure provides for a lens having the predetermined thickness of the lens area over the majority of the corneal surface regardless of the lens power. This differs from the predicate lenses made of polydimethylsiloxane which have only a high thickness at the geometric center of the lens and which rapidly thin due to the convex curvature of the front surfaces being shorter in radius than the concave curvature of the back surfaces of the lenses and for the purpose of producing high plus dioptric powers to correct aphakia. By way of example, a lens of the present invention having no power and with parallel surfaces or with the usual powers for refractive error correction comprises a thickness to produce a water transmissibility that is not greater than, B/t=13887.5 Barrers/cm; while producing an oxygen transmissibility, Dk/t, that is greater than or equal to $24.1 \pm 2.7 \times 10^{-9}$ (cm×ml $O_2$)/(sec×ml×mmHg).

It should be recognized by those skilled in the art of contact lens design and manufacture that the most preferred solution to the dilemma of high water transport accompanying high oxygen permeability would be a material intrinsically possessing the permeabilities for these components such that the oxygen and water transport were both as required physiologically. Of course those skilled in the art should realize such a material would also have to meet all the requirements (biocompatibility, good wetting, appropriate mechanical properties, non-toxicity, durability and cost effectiveness) that are necessary for an acceptable contact lens. Work toward this goal continues to this day, however even after 50 years of searching, no such product has been reported.

Given this fact, the embodiment proposed above offers one solution to the dilemma, while an alternative embodiment provides for a different approach: one which employs different materials each meeting some of the requirements for lens acceptability in a composite configuration wherein the individual limitations of the combined materials are mitigated by the extent and or location within the final product that the components are deployed. For instance, mechanical limitations can be mitigated by use of minimal thickness in the lens and biocompatibility or post lens tear film volume might be mitigated by sequestering such components within a "sandwich" of materials performing better in those aspects.

More specifically an alternate embodiment of the present invention is a lens comprised of at least two separate layers deployed such that the more biocompatible layers would be the elements in contact with the anterior and posterior tear films. Elements possessing less desirable mechanical properties or oxygen permeabilities would be deployed in thin layers. The relative thickness of the individual layers within the sandwich would be imposed in relation to the oxygen permeability and water permeability of the individual materials. The determining factors for the relative thickness would be their summed permeabilities for oxygen and their summed permeabilities for water vapor, while attempting to keep the maximum oxygen permeability and the minimum water vapor permeability. It is important to note that it is not the arithmetic sum of the permeabilities; rather, their appropriately summed properties with recognition that the summed properties actually represent the resistance to per meation as opposed to the quantity of transmission allowed. The appropriate mathematical expression is:

$$\frac{E_t}{P} = \sum_{i=1}^{n} \frac{E_i}{P_i} \qquad \text{Equation 1}$$

Where P is the permeability to a specified permeant of the composite and $E_i$ the thickness of the $i_{th}$ layer, $P_i$ the permeability of the $i^{th}$ layer to the same permeant and $E_t$ the total thickness of the composite in mm. The permeabilities must be expressed in the same units preferably derived by similar methods. Thus a new permeability can be derived for the composite for each of the permeants of interest. Furthermore, it is convenient for each permeant to express its revised permeability as a fraction of its original permeability of the material having the highest permeation for that permeant. This expresses the compromise accepted for that permeant by sandwiching it with the other material layers.

In a particular embodiment, it is desirable to maintain constant thicknesses of the sandwiched layers in the lens. In alternate embodiments, the thickness of the layers may be varied within the sandwich. By way of example, a contact lens of the present disclosure may require that oxygen delivery is more important to the cornea while oxygen deprivation might be less problematic beyond the corneal borders where some oxygen is supplied by the underlying vasculature. Conversely water loss from the tear pool beneath the lens is equally negatively impacted by water loss through the periphery of the lens as opposed to the center. The peripheral area for water loss is by nature larger than the central area of the lens. If the peripheral area possessed a thicker sandwiched layer resistant to water transport despite a concomitant loss of oxygen transport, the overall loss of the tear pool could be substantially impacted while the diminishment of oxygen availability would be mitigated by the lesser need for oxygen and availability of alternate sources under the periphery of the lens.

It is also possible that fabrication of the sandwich requires adhesion of the individual layers and that adhesive films might be required between the primary layers. The permeabilities of these adhesive films are chosen such that in very thin films required for adhesion, they would have little impact on the overall permeability for the composite. However, if they present greater impact they too should be included in the composite permeability computation. In rare cases to get good adhesion there might be the necessity to insert a thin conforming layer between the primary layers such that the sandwich consists of primary layers and secondary layers with all such layers separated by adhesive films. Again the final composite permeability will be derived by the expression given above. In other cases there might be no need for adhesives, such as when the primary layers are intrinsically adhesive to each other or the internal layer(s), are simply encased within the outermost layers which extend slightly beyond the internal layers and are bonded there by adhesive at the perimeter, or are in fact extensions of a single encapsulating layer of the outermost layer formed during a molding process.

The process of selecting the composition and thicknesses for the layers of the sandwich is most conveniently performed using derivatives of the mathematical expression given above. As an example, consider the oxygen and water penetration through a sandwich consisting of two outer layers of one material and one inner layer of another material. Further consider that the two materials had differing ratios of the permeability for oxygen and water such that while in one material the ratio water permeability highly favored the transmission of water over oxygen and in the second material the permeability for water was greatly reduced relative to that of oxygen. The objective is to create a composite sandwich of the two materials wherein the transmission of water is substantially reduced relative to the oxygen permeability and that the overall result is a reduced residual level of oxygen transport that remains within the level acceptable for the intended lens wearing schedule, while the water permeability of the composite is reduced from that of the $1^{st}$ layer alone. Depending on the original magnitudes of the oxygen permeability, one can select a fraction of the original oxygen permeability as a target and compute the fraction of the water permeability remaining. These computations are exemplified below:

$$\frac{1}{\frac{\left(\frac{Tf}{P_{O1}}\right)+\left(\frac{T(1-f)}{P_{O2}}\right)}{P_{O1}}} = \frac{P_{OC}}{P_{O1}} \qquad \text{Equation 2}$$

$$\frac{1}{\frac{\left(\frac{Tf}{P_{W1}}\right)+\left(\frac{T(1-t)}{P_{W2}}\right)}{P_{W1}}} = \frac{P_{WC}}{P_{W1}} \qquad \text{Equation 3}$$

T is the total thickness of the composite; f is the fraction of the composite thickness occupied by the material having the highest oxygen permeability; $P_{OC}$ is the oxygen permeability of the composite; $P_{O1}$ is the oxygen permeability of the first material; $P_{O2}$ is the oxygen permeability of the second material; $P_{wc}$ is the water permeability of the composite; $P_{W1}$ is the water vapor permeability of the first material; and $P_{W2}$ is the water vapor permeability of the second material.

Using literature values of permeabilities to water and oxygen for Polydimethylsiloxane and Amorphous Teflon at a thickness of 1 mm, $_{PO1}$ is the oxygen permeability of the Polydimethylsiloxane; $_{PO2}$ is the oxygen permeability of the Amorphous Teflon; $_{PW1}$ is the water vapor permeability of Polydimethylsiloxane; and $P_{W2}$ is the water vapor permeability of Amorphous Teflon. Given these values a composite can maintain greater than 80% of the oxygen permeability of pure PDMS while reducing the water permeation rate to little more than 10% of the permeability of pure PDMS.

Figure 7:
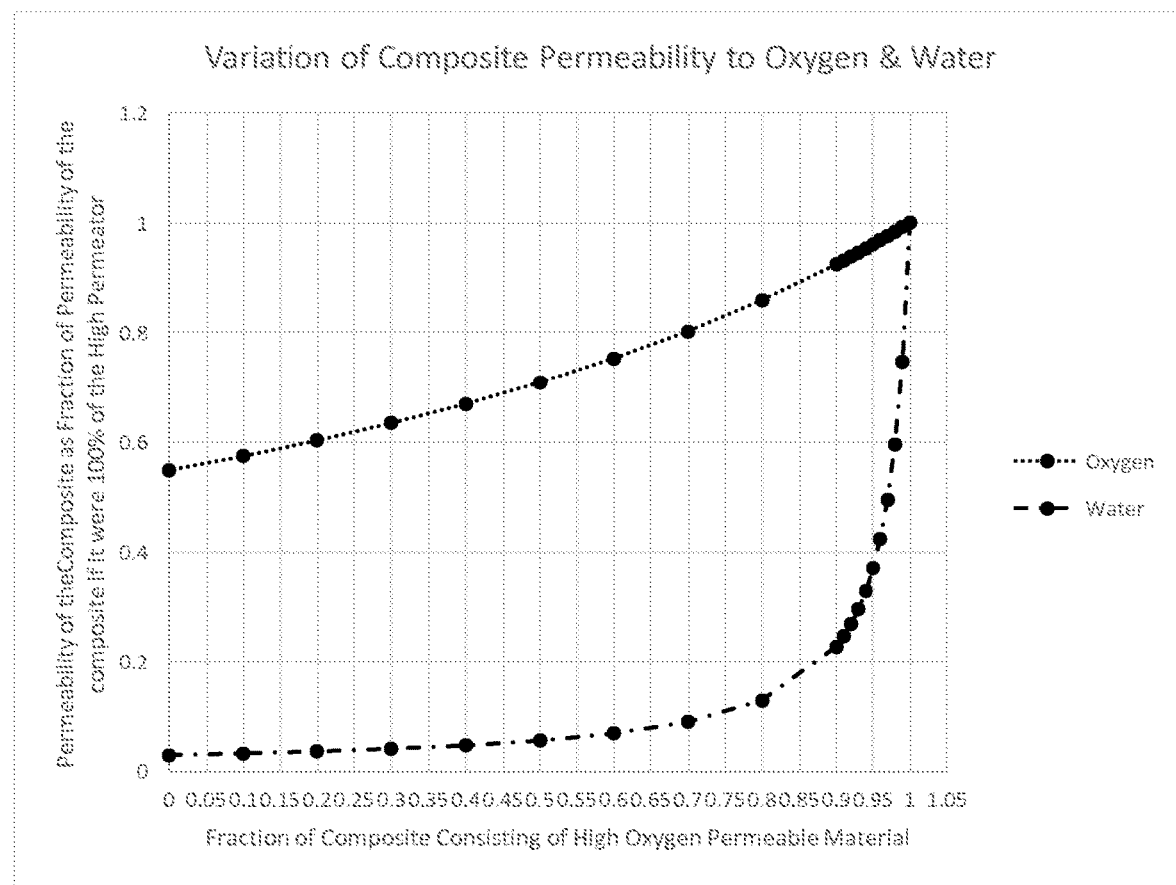
FIG. 7 is a chart of variation of composite permeability to oxygen and water as a fraction of those permeabilities originally expressed by a full thickness of only one of the materials prior to inclusion of a second material layer and the change to those original permeabilities by exchanging partial thicknesses of the original material layer by equivalent partial thickness layers of a second material, that second material having different permeabilities for oxygen and water vapor.

FIG. 7 is a chart of variation of composite permeability to oxygen and water. While the absolute values of the fractions as expressed in the chart at the end points are controlled by the absolute permeability values of the two components, another very important feature of these values is exposed in this chart. This feature is the asymmetry of the two functions. While the oxygen permeability regresses relatively linearly from its high point when none of the second component is present to its low point when only the second component is present, the water permeability function behaves quite differently. The water permeability of the composite compared to the water permeability of the first component drops precipitously at first inclusion of even very thin layers of the second component. Such asymmetry allows for superior enhancement of the water permeability with little impact on the oxygen permeability of the composite compared to the first material. A very thin layer of the second material suffices to vastly diminish the excessive water permeability of the first material leaving intact the first material's superior oxygen permeability.

The aspects of the permeabilities employed in this composite that are most responsible for this preferred asymmetry in the result is the disparity in the ratios of the water permeability in the first material relative to that of the second ($P_{w1}/P_{w2}$) compared to the oxygen permeability in the first material relative to that of the second ($P_{O1}/P_{O2}$) The greater this disparity the greater the asymmetry. In this specific case where preserving oxygen permeability is desired and reducing water permeability is simultaneously preferred, selecting a second material keeping the oxygen permeability ratio ($P_{O1}/P_{O2}$) small while the water permeability ratio ($P_{w1}/P_{w2}$) is substantially greater leads to the successful relatively large reduction of water permeability with little reduction of the oxygen permeability by inclusion of a very thin layer of the second material within the first.

Figure 8:
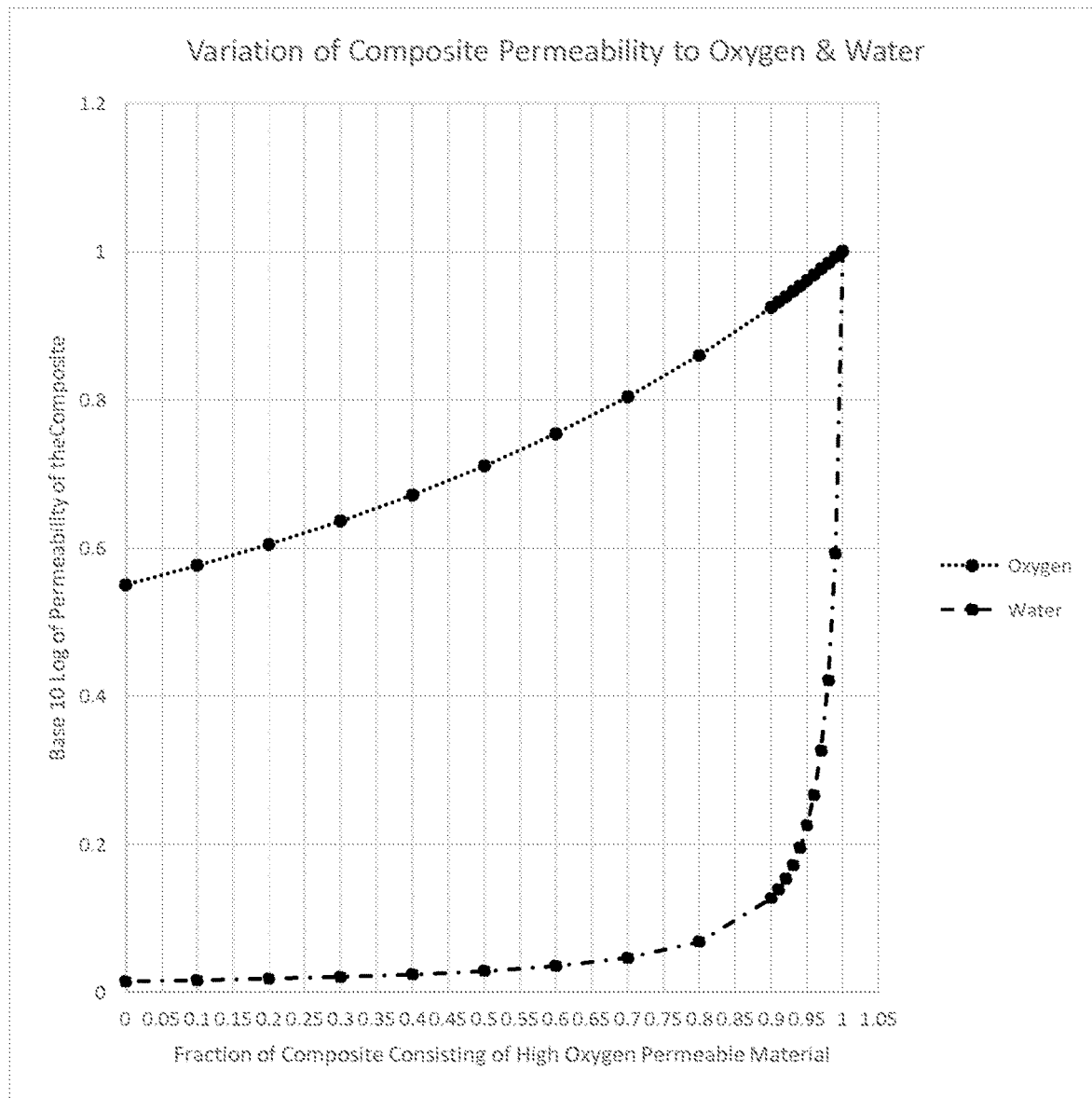
FIG. 8 is a chart of a first scenario wherein the oxygen permeability ratios$_{(PO1/PO2)}$ are held constant.
Figure 9:
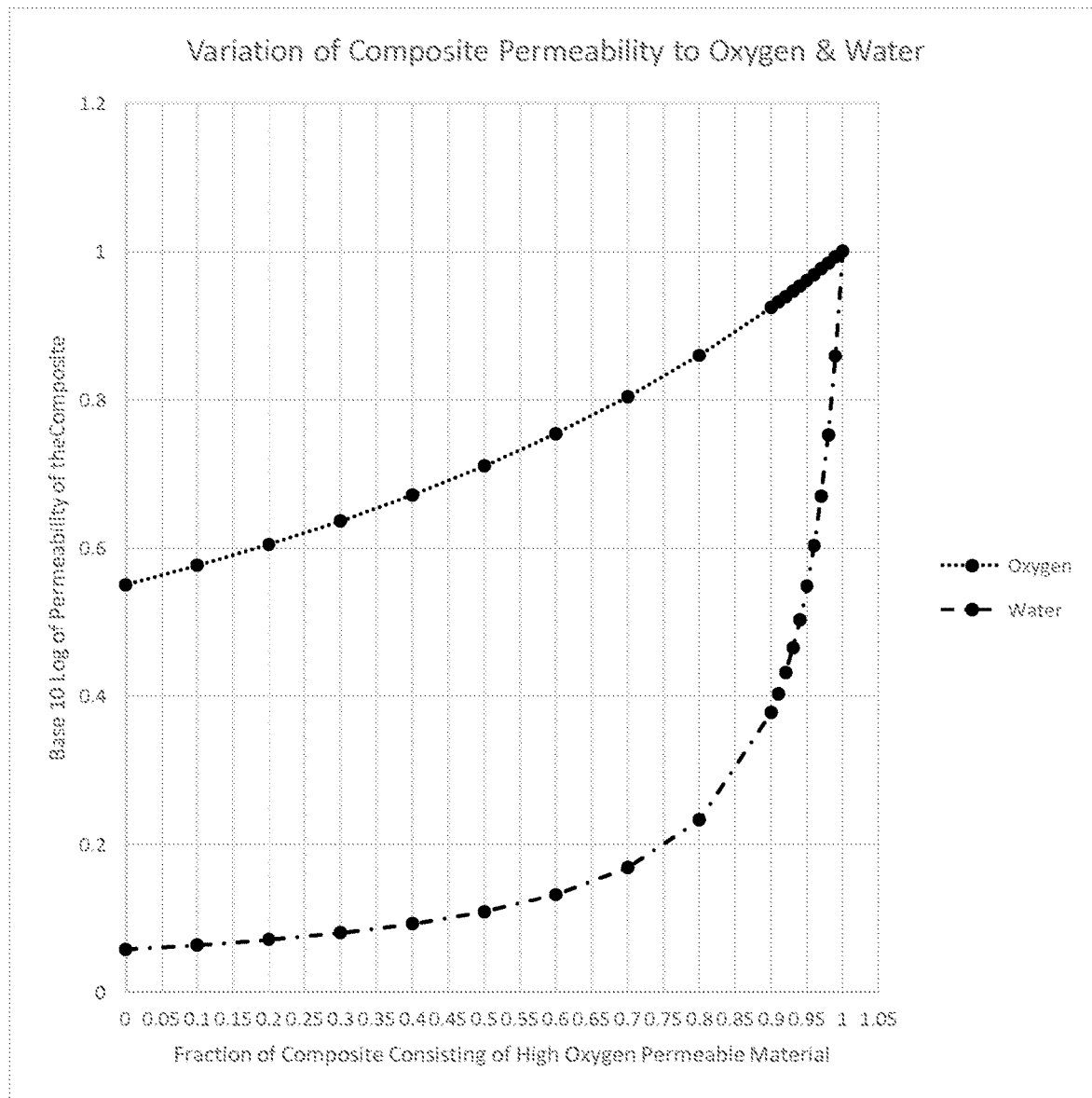
FIG. 9 is a chart of a second scenario wherein the oxygen permeability ratios$_{(PO1/PO2)}$ are held constant.

FIG. 8 shows a chart of a first scenario wherein the oxygen permeability ratios ($P_{O1}/P_{O2}$) are held constant, but the ratio of water permeability ratios ($P_{w1}/P_{w2}$) is larger than that in FIG. 7. FIG. 9 shows a chart of a second scenario wherein the oxygen permeability ratios ($P_{O1}/P_{O2}$) are held constant, but the ratio of water permeability ratios ($P_{w1}/P_{w2}$) is less than that of FIG. 7. In these two charts, wherein the oxygen permeability ratios ($P_{O1}/P_{O2}$) are held constant, one sees that in two alternate cases, the water permeability ratios ($P_{w1}/P_{w2}$) differ (one less positive and one more positive). It is observed that the more positive this ratio the greater the preferred asymmetry in the functions.

In a particular embodiment, the medium, or second component or material, within the first material, has a water permeability of less than 10,000 Barrers and an oxygen permeability of greater than 200 Barrers. Another embodiment provides for an area of the composite film measuring greater than fifty square millimeters of the contact lens that has a thickness of the medium providing a water transmissibility below a maximum value, such as 13887.5 Barrers/cm, while providing an oxygen transmissibility above a minimum value, such as $24.1 \times 10^{-9}$ (cm×ml $O_2$)/(sec×ml× mmHg).

As discussed above, a permeant ratio for a particular permeant is calculated by taking the ratio of permeability for a permeant of a first material (e.g. $P_{O1}$) to the (or over the) permeability for a permeant for a second material (e.g. $P_{O2}$). In particular embodiments, the contact lens has different ratios of permeability for two permeants. As shown above, the composition of the two different layered materials can be chosen to make a second permeant ratio larger than the first permeant ratio. For example, the contact lens can have a first permeant ratio for the permeant oxygen that is smaller than a second permeant ratio for the permeant water (or water vapor). In a particular embodiment, the compositions of the layered materials are chosen such that first permeant ratio is 5 or smaller and the second permeant ratio is 10 or larger. In another embodiment, the first permeant ratio is 3 or smaller and the second permeant ratio is 20 or larger. In yet another embodiment, the first permeant ratio is 2 or smaller, and the second permeant ratio is 30 or larger.

The differences between the permeability of a permeant of the composite contact lens and a layered material relative to that layered material can be expressed as a percent difference. In a particular embodiment, the composition of the medium and layer thicknesses of the medium may be chosen such that the permeability for a first permeant, such as oxygen, of the composite contact lens is no less than twenty percent of the permeability for the first permanent of the primary material, such as cross-linked polydimethylsiloxane. In another embodiment, the permeability for the first permeant of the composite film is no less than fifty percent of the permeability for the first permanent of the primary material. In yet another embodiment the permeability for the first permeant of the composite film is no less than seventy-five percent of the permeability for the first permanent of the primary material. In yet another embodiment the permeability for the first permeant of the composite film is no less than ninety percent of the permeability for the first permanent of the primary material. In yet another embodiment the permeability for the first permeant of the composite film is no less than ninety-five percent of the permeability for the first permanent of the primary material.

Another embodiment has a permeability for the second permanent, such as water or water vapor, of the composite film which is no more than ninety-five percent of the permeability for the second permanent of the primary material, such as cross-linked polydimethylsiloxane. In another embodiment, the permeability for the second permeant of the composite film is no more than ninety percent of the permeability for the second permanent of the primary material. In an additional embodiment, the permeability for the second permeant of the composite film is no more than seventy-five percent of the permeability for the second permanent of the primary material. In yet another embodiment, the permeability for the second permeant of the composite film is no more than fifty percent of the permeability for the second permanent of the primary material. In a further embodiment, the permeability for the second permeant of the composite film is no more than twenty-five percent of the permeability for the second permanent of the primary material. In a further embodiment, the permeability for the second permeant of the composite film is no more than ten percent of the permeability for the second permanent of the primary material.

Referring now to FIG. 1, it depicts a contact lens 100 in accordance with selected embodiments of the current disclosure. The contact lens 100 has a first thickness 101 approximating a conventional contact lens thickness bounded by a first anterior surface 102, and an additional lens thickness 103 of the same material for the purpose of reducing the water transmissibility of the finished lens to the limitations of the present disclosure. In a particular embodiment, the first lens thickness 101 is a primary material film, and the additional lens thickness 103 is the same primary material film where the primary material film is made at least in part from polymer containing cross-linked polydimethylsiloxane or an alternate material having a Dk equal to or greater than 200 Barrers.

As will be understood by those of skill in the art, particular embodiments of the current disclosure may have an additional thickness 103 that is not limited to a location at the anterior surface, to a symmetrical configuration, to a uniform thickness profile, or to a centered position relative to the geometric center of the contact lens 100. For example, the additional thickness may be employed symmetrically or asymmetrically, or a regional placement may be employed. In this manner, the lens can be customized for the inclusion of a number and variety of thickness profiles to provide the desired oxygen and water transmissibilities of the finished contact lens 100. Furthermore, the first thickness 101 and the additional lens thickness 103 can be one contiguous element, or two distinct layers with encapsulated components each with a surface contacting the other.

Figure 2:
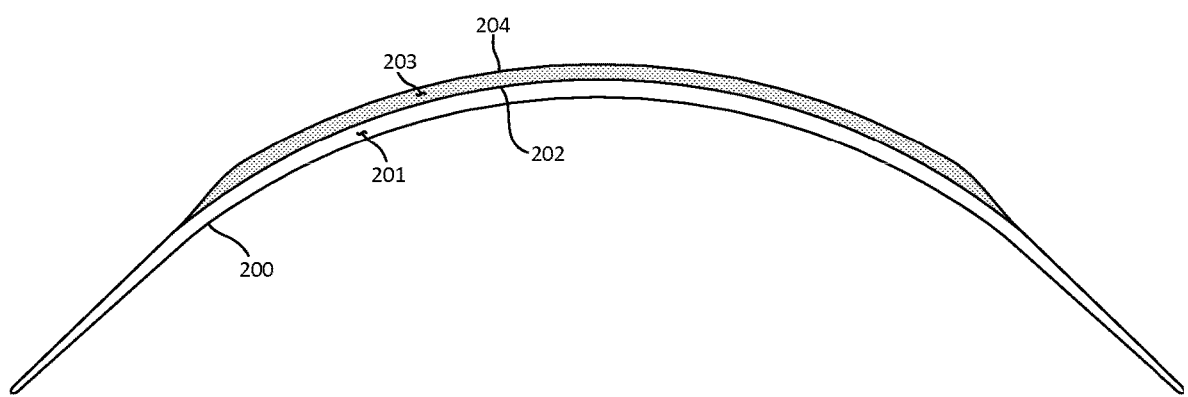
FIG. 2 is a cross-sectional view of a contact lens with two layers with varying permeabilities for oxygen and for water vapor in accordance with selected embodiments of the current disclosure.

FIG. 2 depicts a contact lens 200 in accordance with selected embodiments of the current disclosure. The contact lens 200 has a first material film 201 bounded by a first material interface 202, and a second material film 203 bounded by an anterior surface 204, for the purpose of reducing the water transmissibility of the finished lens to the limitations of the present disclosure. In a particular embodiment, the first material film 201 is a primary material film, and the additional lens thickness 203 is a layered secondary material film, where at least one of the layered primary material film or layered secondary material film are made at least in part from polymer containing cross-linked polydimethylsiloxane or an alternate material having a Dk equal to or greater than 200 Barrers.

As will be understood by those of skill in the art, particular embodiments of the current disclosure may have a secondary material film 203 that is not limited to a location at the anterior surface, to a symmetrical configuration, to a uniform thickness profile, or to a centered position relative to the geometric center of the contact lens 200. For example, the secondary material film may be employed posterior or anterior to the primary material film. The secondary material film may be employed symmetrically or asymmetrically, or a regional placement may be employed. In this manner, the lens can be customized for the inclusion of a number and variety of thickness profiles of the primary and secondary material films to provide the desired oxygen and water transmissibilities of the finished contact lens 200. Furthermore, the first thickness 201 and the additional lens thickness 203 can be one contiguous element, or two distinct layers with encapsulated components each with a surface contacting the other.

Figure 3:
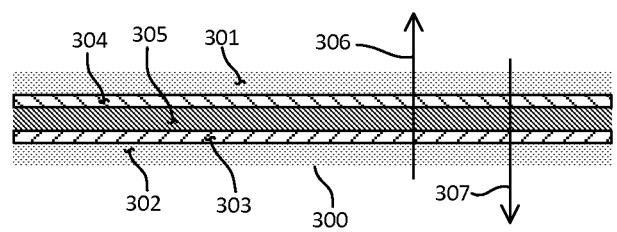
FIG. 3 is a cross-sectional view of a contact lens with multiple layers with varying permeabilities for oxygen and for water vapor in accordance with selected embodiments of the current disclosure.

FIG. 3 depicts a cross section of a segment of contact lens 300 in accordance with selected embodiments of the current disclosure. The multi-layered contact lens 300 has an anterior layer 301, a posterior layer 302, a first internal layer 303, a second internal layer 304 and a third internal layer 305. The contact lens 300 demonstrates relevant water transmissibility in the direction of the arrow 306, which is from the environment posterior to the posterior layer 302 and toward the environment anterior to the anterior layer 301.

With continued reference to FIG. 3, the contact lens 300 demonstrates relevant oxygen transmissibility in the direction of the arrow 307, which is from the environment anterior to the anterior layer 301, and toward the environment posterior to the posterior layer 302. As will be understood by those of skill in the art, particular embodiments of the current disclosure may have layers that are not limited in number, to regional locations within or at the apparent relative depths in the lens 300, to a symmetrical configuration, to a uniform thickness profile, or to a centered position relative to the geometric center of the contact lens 300. For example, fewer or additional layers or a deeper or shallower placement of a layer may be employed, or a regional placement may be employed. In this manner, the lens can be customized for the inclusion of a number and variety of layers and the thickness of the layers can be determined to provide desired oxygen and water transmissibilities.

Figure 4:
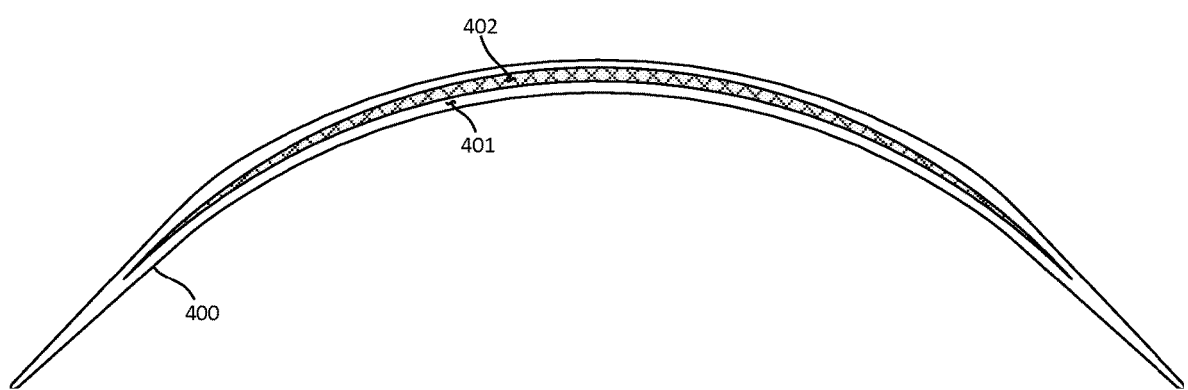
FIG. 4 is a cross-sectional view of a contact lens with an outer lens material and an inner material layer in accordance with selected embodiments of the current disclosure.

FIG. 4 depicts a cross section of a layered contact lens 400 in accordance with selected embodiments of the current disclosure. The layered contact lens 400 has first material 401, and a second material layer 402. The second material layer 402 of the contact lens 400 has a variable thickness profile and is placed in a region of the contact lens 400. In a particular embodiment, the first material 401 is a layered primary material film, and the second material layer 402 is a layered secondary material film. The layered primary material film is made at least in part from polymer containing silicone acrylate. Alternatively, the layered primary material film is made at least in part from polymer containing cross-linked polydimethylsiloxane or an alternate material having a Dk of equal to or greater than 200 Barrers. The layered secondary material film is made from films having water permeability less than 10,000 Barrers, such as amorphous or crystalline fluorocarbon containing films. Alternatively, the layered secondary material film is made from polyurethane containing films having water permeability less than 10,000 Barrers. In yet another alternative embodiment, the layered secondary material film is made at least from silicone containing films having water permeability at least less than 10,000 Barrers.

With continued reference to FIG. 4, the second material 402 is thicker at its center and thinner at its peripheral edges. The contact lens 400 includes a posterior layer of the first material 401 which is posterior to the second material layer 402 and which has a uniform thickness. Further, the contact lens 400 includes an anterior layer of the first material 401, which is anterior to the second material 402 and is thinner at its center and is thicker in the mid periphery of the anterior layer. As will be understood by those of skill in the art, particular embodiments of the current disclosure provide that the layers are not limited in number, to their locations at the apparent thicknesses within the contact lens 400, to a symmetrical configuration, to a uniform thickness profile, or to a centered position relative to the geometric center of the contact lens 400. For example, additional layers or a deeper or shallower placement of the layers may be employed, or a regional placement may be employed. In this manner, the lens can be customized for the inclusion of a number and variety of layers and the thickness of the layers can be determined to provide desired oxygen and water transmissibilities.

Figure 5:
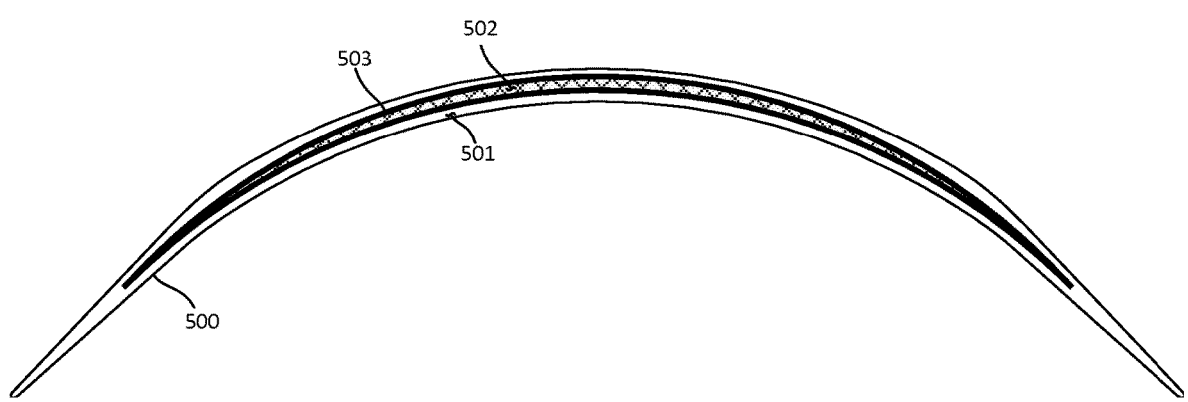
FIG. 5 is a cross-sectional view of a contact lens with an outer lens material, an inner material layer and an adhesive layer between the layers in accordance with selected embodiments of the current disclosure.

FIG. 5 depicts a cross section of a layered contact lens 500 in accordance with selected embodiments of the current disclosure. The layered contact lens 500 has first material 501, a second material layer 502, and an adhesive layer 503. The second material layer contact lens 502 has a variable thickness profile and is placed in a region of the contact lens 500.

With continued reference to FIG. 5, the second material 502 is thicker at its center and thinner at its peripheral edges. The contact lens 500 includes a posterior layer of the first material 501 which is posterior to the second material layer 502 and which has a uniform thickness. Further, the contact lens 500 includes an anterior layer of the first material 501, which is anterior to the second material 502 and is thinner at its center and is thicker in the mid periphery of the anterior layer. The adhesive layer 503 surrounds the second material layer 502. In an alternative embodiment, the adhesive layer 503 may not surround a second layer and may be applied to only one partial surface of region of a layer.

As will be understood by those of skill in the art, particular embodiments of the current disclosure provide for one or more adhesives that may be applied having the same or different relative permeabilities and in a stacked manner or regionally. Furthermore, the layers may not limited in number, to their locations at the apparent thicknesses within the contact lens 500, to a symmetrical configuration, to a uniform thickness profile, or to a centered position relative to the geometric center of the contact lens 500. For example, additional layers or a deeper or shallower placement of the layers may be employed, or a regional placement may be employed. In this manner, the lens can be customized for the inclusion of a number and variety of layers and the thickness of the layers can be determined to provide desired oxygen and water transmissibilities.

Figure 6:
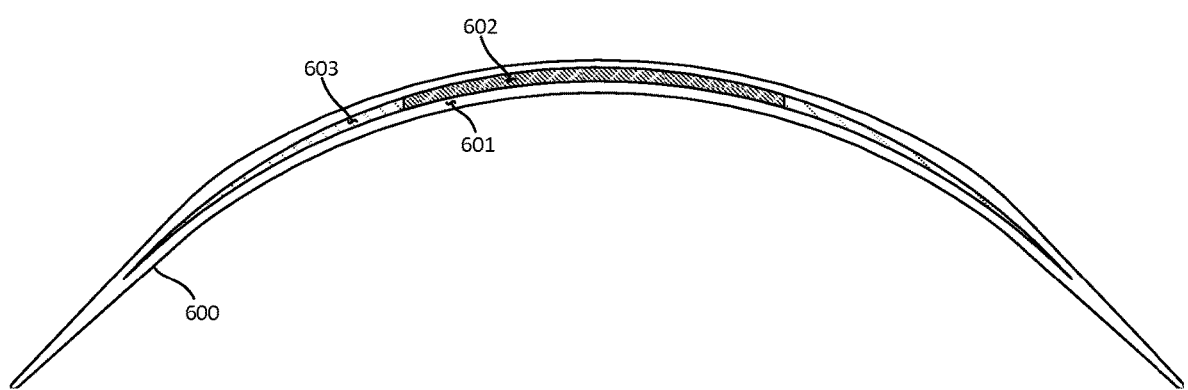
FIG. 6 is a cross-sectional view of a contact lens with an outer lens material and inner material layers displaced in regions of the contact lens in accordance with selected embodiments of the current disclosure.

FIG. 6 depicts a cross section of a layered contact lens 600 in accordance with selected embodiments of the current disclosure. The layered contact lens 600 has first material 601, a second material layer 602 and a third material 603 peripheral to the second material 602. The second material 602 has a relatively uniform thickness profile and is placed in the central region of the contact lens 600. Layer 602 may alternatively have the same composition as layer 601. The third material 603 has a variable thickness and is placed in the mid-peripheral region of contact lens 600.

With continued reference to FIG. 6, the second material 602 is relatively uniform in its thickness. The third material 603 is thicker at its center and thinner at its peripheral edges. The contact lens 600 includes a posterior layer of the first material 601, which has a relatively uniform thickness and which is posterior to the second material layer 602 and the third material 603. Further, the contact lens 600 includes an anterior layer of the first material 601, which is thinner at its center, thicker in the mid periphery of the anterior layer, and anterior to the second material 602 and the third material 603.

As will be understood by those of skill in the art, particular embodiments of the current disclosure provide layers that are not limited in number, to their locations at the apparent thicknesses within the contact lens 600, to a symmetrical configuration, to a uniform thickness profile, or to a centered position relative to the geometric center of the contact lens 600. For example, additional layers or a deeper or shallower placement of the layers may be employed, or a regional placement may be employed. In this manner, the lens can be customized for the inclusion of a number and variety of layers and the thickness of the layers can be determined to provide desired oxygen and water transmissibilities.

Various methods of fabrication may be used to create the composite film and contact lens disclosed herein. For example, the contact lens may be fabricated at least in part by molding, including cast molding and compression molding. Melt pressing and solution casting may also be implemented, at least in part, to fabricate the contact lens. Additionally, the contact lens may be fabricated at least in part by lathing.

The different materials making up the material films, composite films, and/or contact lens can have different moduli. Modulus, or more specifically an elastic modulus, of a material is a measure of the material's resistance to being deformed elastically. In a particular embodiment, the modulus of the primary material films is greater than the modulus of the secondary material films. In alternative embodiment, the modulus of the primary material films is less than the modulus of the secondary material films.

In addition to providing a contact lens with a minimum transmissibility of the permeant oxygen, the contact lens may also have a minimum transmissibility of a permeant such as carbon dioxide. In such a case, the layers of material film and/or thickness of the contact lens are set for a minimum carbon dioxide transmissibility, instead of or in addition to the minimum oxygen transmissibility.

The same principals discussed above also provide for the delivery of a therapeutic agent. A therapeutic agent delivery device comprises a composite film, where the composite film comprises one or more layered primary material films and one or more layered secondary material films, where the composite film has a thickness, a permeability for a first permeant, and a permeability for a second permeant; where the primary material films and secondary material film each have a thickness, a permeability for a first permeant, and a permeability for a second permeant; where the thickness of the composite comprises the summed thicknesses of the primary material layers and secondary material layers, where the thickness of the primary films and the thickness of the secondary films are such that the difference between the permeability for the first permeant of the composite film and the permeability for the first permeant of the primary material films is less than the difference between the permeability for the second permeant of the composite film and the permeability of the second permeant the primary material films. In such an embodiment, the second permeant is a therapeutic substance.

It should be understood that while various embodiments of the invention are described in some detail herein, the present disclosure is made by way of example only and that variations and changes thereto are possible without departing from the subject matter coming within the scope of the following claims, and a reasonable equivalency thereof, which claims are regarded as the invention.

What is claimed is:

1. A soft contact lens consisting of:
   a single soft contact lens material having an oxygen permeability and a water permeability;
   wherein the soft contact lens has an average thickness of at least 0.2 millimeters, a water transmissibility below 13887.5 Barrers/cm, and an oxygen transmissibility above $24.1 \times 10^{-9}$ (cm×ml $O_2$)(sec×ml×mmHg);
   wherein the water permeability of the single soft contact lens material is less than 20,000 Barrers; and
   wherein the oxygen permeability of the single soft contact lens material is greater than 200 Barrers.

2. The soft contact lens of claim 1, wherein the single soft contact lens material is a polymer containing cross-linked polydimethylsiloxane.

3. The soft contact lens of claim 1, wherein the single soft contact lens material is a cross-linked polydimethylsiloxane.

4. The soft contact lens of claim 1, wherein the average thickness of the soft contact lens is at least 0.3 millimeters.

5. The soft contact lens of claim 1, wherein the average thickness of the soft contact lens is at least 0.29 millimeters.

6. A soft contact lens consisting of:
   a single soft contact lens material;
   wherein the soft contact lens has an average thickness of at least 0.2 millimeters, a water transmissibility that is below 13887.5 Barrers/cm, and an oxygen transmissibility above $24.1 \times 10^{-9}$ (cm×ml $O_2$)(sec×ml×mmHg).

7. The soft contact lens of claim 6, wherein the single soft contact lens material has a water permeability of less than 20,000 Barrers and an oxygen permeability of greater than 200 Barrers.

8. The soft contact lens of claim 6, wherein the single soft contact lens material is a cross-linked polydimethylsiloxane.

9. The soft contact lens of claim 6, wherein the average thickness of the soft contact lens is 0.29 millimeters.

10. The soft contact lens of claim 6, wherein the average thickness of the soft contact lens is at least 0.3 millimeters.

* * * * *